Patented Nov. 27, 1945

2,389,803

UNITED STATES PATENT OFFICE 2,389,803

STABILIZING ORGANO-SILOXANES

Rob Roy McGregor, Verona, and Earl Leathen Warrick, Pittsburgh, Pa., assignors to Corning Glass Works, Corning, N. Y., a corporation of New York No Drawing. Application June 22, 1944, Serial No. 541,668

6 Claims. (Cl. 260—607)

This invention relates to organo-siloxanes, and particularly to the stabilization thereof.

Organo-siloxanes are compositions comprising essentially silicon atoms connected to each other by oxygen atoms through silicon-oxygen linkages, thus

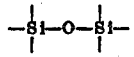

and organic radicals attached through carbon-silicon linkages to at least some of the silicon atoms. They may be prepared by the hydrolysis of a hydrolyzable organo-mono-silane followed by condensation (partial or complete) of the hydrolysis product. They may also be prepared by hydrolyzing and condensing mixtures of different hydrolyzable organo-monosilanes, as described in the copending application of James Franklin Hyde, Serial Number 432,528 filed February 26, 1942, and assigned to the assignee of the present invention. In the latter case, hydrolyzable silanes which contain no organic radicals attached to silicon through carbon-silicon linkages, such as silicon tetrachloride or ethyl ortho-silicate, may be included with the organo-silanes, if desired. By employing mixtures of silanes, it is possible to prepare organo-siloxanes which contain on the average up to and including three organic radicals per silicon atom.

By hydrolyzable organo-monosilanes, we mean derivatives of $SiH_4$, which contain hydrolyzable radicals such as halogens, amino groups, alkoxy, aroxy and acyloxy radicals, etc., and organic radicals that are joined to silicon through carbon-silicon linkage. Examples of such organic radicals are as follows: aliphatic radicals such as methyl, ethyl, propyl, isopropyl, butyl, amyl, hexyl, heptyl to octadecyl and higher; alicyclic radicals such as cyclopentyl, cyclohexyl, etc.; aryl and alkaryl radicals such as phenyl, mono- and poly-alkyl phenyls as tolyl, xylyl, mesityl, mono-, di-, and tri-ethyl phenyls, mono-, di-, and tri-propyl phenyls, etc., naphthyl, mono- and poly-alkyl naphthyls as methyl naphthyl, diethyl naphthyls, tri-propyl naphthyl, etc.; tetra-hydro-naphthyl, anthracyl, etc.; aralkyl such as benzyl, phenyl-ethyl, etc.; alkenyl such as methallyl, allyl, etc., and heterocyclic radicals. The above organic radicals may also, if desired, contain inorganic substituents such as halogens, etc.

Hydrolysis of the above silanes or mixtures thereof is generally accompanied by condensation of the intermediately formed hydroxy compounds to form siloxane linkages, thus,

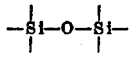

The formation of a siloxane linkage generally results from the close approach of two hydroxyl groups and subsequent elimination of water. It may also result from the close approach of one hydroxyl group to a hydrolyzable group such as halogen, acyloxy, or alkoxy, etc., and subsequent elimination of hydrogen halide, carboxylic acid or alcohol, respectively. Such eliminations are catalyzed by mineral acids, especially hydrochloric and sulphuric, and by alkali metal hydroxides, especially sodium hydroxide. As a result of the hydrolysis and condensation, organo-siloxanes are produced which are partially or completely condensed and which have on the average up to and including three organic radicals attached to each silicon atom. These organo-siloxanes, as previously mentioned, consist essentially of silicon atoms joined together by oxygen atoms through silicon-oxygen linkages and organic radicals attached to silicon through carbon-silicon linkages, the remaining valences, if any, of the silicon atoms being satisfied by hydroxyl radicals and/or by residual unhydrolyzed radicals such as halogens, alkoxy, etc. listed above as the hydrolyzable radicals.

The organo-siloxanes so obtained, some of which are liquids, others solids, differ with respect to their resistance to heat. In general, the partially condensed liquid siloxanes undergo a change in physical properties when heated, becoming more viscous, until finally they may become solids. On the other hand, those which are completely condensed, or nearly so, (i. e. substantially free of hydroxyl groups) are extremely resistant to further change due to heat alone. However, even the latter may be further polymerized by contact with acidic agents, alkaline agents, or with air, as disclosed in the copending applications of James Franklin Hyde, Serial Number 481,155, filed March 30, 1943, Serial Number 481,154, filed March 30, 1943, and Serial Number 451,354, filed July 17, 1942, all being assigned to the assignee of the present invention.

All the organo-siloxanes, both solid and liquid, undergo a gradual change in properties when exposed to the combined effect of heat and air for a prolonged period of time. This is true even of the completely condensed siloxanes. In the case of the liquid organo-siloxanes, the effect of heat and air is manifested by an increase in viscosity, frequently followed by gelation. This is objectionable where the liquid is being utilized as a hydraulic fluid, dielectric medium and the like. The resinous solid siloxanes, after long exposure to oxygen at elevated temperatures, also undergo a change in properties, becoming less flexible and tough until eventually they reach an extremely brittle stage. Such changes in properties due to heat or to heat and air combined are obviously undesirable.

The primary object of this invention is to stabilize organo-siloxanes.

Another object is to provide a method by which changes of properties of organo-siloxanes due to heat and/or oxygen can be prevented.

Another object is to provide a stabilizer for organo-siloxanes.

We have discovered that the stability of an organo-siloxane may be substantially improved by incorporating therein a minor proportion of an aromatic amine having the general formula

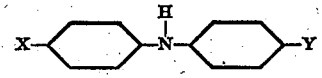

wherein X is a member of the class consisting of hydrogen, hydroxyl and alkoxyl radicals having 1 to 4 carbon atoms inclusive and Y is a member of the class consisting of hydroxyl, arylamino and alkoxyl radicals having 1 to 4 carbon atoms inclusive. From 0.05 to 5 per cent, preferably from 0.1 to 1.5 per cent by weight of the stabilizer may be included in the composition to advantage. Although larger amounts of the stabilizer may be used, if desired, little advantage is gained thereby. The so-formed stabilized composition exhibits a marked improvement in resistance to heat and air, and to small quantities of agents which cause polymerization of the siloxanes.

Among the stabilizers of the class described which may be mentioned are 4-isopropoxydiphenylamine, 4·4'-dimethoxydiphenyl amine, 4-hydroxy diphenylamine, 4·4'-dihydroxy diphenylamine, 4-hydroxy-4'-methoxy diphenylamine, 4-hydroxy-4'-ethoxy diphenylamine, 4-hydroxy-4'-butoxy-diphenylamine, 4-ethoxy diphenylamine, 4·4'-diethoxy diphenylamine, 4-ethoxy-4'-butoxy diphenylamine, 4-phenylaminodiphenylamine, 4-tolylaminodiphenylamine, N-N-diphenyl 1,4 phenylene diamine, and 4-phenylamino-4'-ethoxy diphenylamine.

In order to obtain the maximum effectiveness from the aromatic amines, it is necessary to react the latter with the organo-siloxane. This may be accomplished by heating the liquid siloxane, to which a small amount of the aromatic amine has been added, to an elevated temperature. The most effective temperature for reaction to take place depends, as will be readily appreciated, upon the compositions, both siloxane and amine, involved. However, the reaction may be effected at a lower temperature but the time required for completion is longer. In general, color develops in the solution as the reaction proceeds.

The effectiveness of the aromatic amines of our invention in stabilizing the organo-siloxanes may be demonstrated by comparing the change in viscosity over a period of time at 250° C. in air of an organo-siloxane to which no stabilizer had been added with an organo-siloxane to which a stabilizer had been added. By way of illustration, several samples of a liquid dimethyl silicone (prepared by the acid hydrolysis of dimethyl-diethoxysilicane and having a viscosity of 488 centistokes at 25° C.) were treated with 1% by weight of a number of different stabilizers of the class described. The treatment consisted in adding the stabilizer to the liquid dimethyl silicone and heating the mixture in air at 250° C. In each case, viscosity was plotted against time in hours until the smooth polymerization curve thus obtained made a sharp break upward indicating incipient gelation. The following table tabulates the results obtained for some of the amines employed along with those obtained in the case of an unstabilized sample. In the column under the heading "Incipient gelation" are given the hours required to reach the point where the polymerization curve broke sharply upward. In the column under the heading "Slope" are given the values obtained by dividing the total per cent viscosity increase by the time in hours at 250° C. required to reach the point of incipient gelation. These "Slope" values correspond to the average increase in viscosity per hours.

Table

| Inhibitor | Incipient gelation | Slope |
| --- | --- | --- |
| None | 5 | 55.0 |
| 4-isopropoxy-diphenyl-amine | 183 | 6.0 |
| 4,4' dimethoxy diphenyl amine | 150 | 11.4 |
| 4-hydroxy diphenyl amine | 150 | 13.4 |
| N,N diphenyl 1,4 phenylene diamine | 150 | 17.5 |

It will be readily apparent from the above table that the use of the stabilizers lengthens considerably the time required to reach gelation and also substantially reduces the viscosity increase per hour, i. e. the slope of the polymerization curve.

We have found that the above aromatic amines are not only effective in stabilizing the partially dehydrated siloxanes, but also the completely dehydrated siloxanes. The latter are ordinarily quite stable substances but even they undergo oxidation and possibly rearrangement in the presence of oxygen at elevated temperatures, whereby the use of stabilizers becomes important. However, the use of a stabilizer is particularly advantageous in the case of liquid organo-siloxanes having on the average from approximately one to approximately two monovalent organic radicals attached to each silicon atom, at least some of the radicals being alkyl radicals, since these siloxanes are particularly sensitive to heat and air at elevated temperatures. Examples of these are ethyl siloxanes, proply siloxanes, amyl siloxanes, etc., and the aryl alkyl siloxanes such as phenyl methyl siloxanes, phenyl ethyl siloxanes, etc.

In general organo-siloxanes treated in accordance with our invention are more resistant to change in physical properties under the influence of heat and air. Specifically the liquid organo-siloxanes are thereby rendered more resistant to increase the viscosity or polymerization due to the effects of heat, the action of oxygen and catalysts in general. Because of their low pour points, small change of viscosity with temperature and inertness to rubber, they are useful as hydraulic fluids for the transmission of pressure, and also as damping media for delicate instruments and recoil mechanisms or shock absorbing devices.

The resinous solid organo-siloxanes when stabilized in accordance with our invention, retain their flexibility and toughness for a greater length of time and are thereby rendered more useful as electrically insulating coatings for metallic conductors, etc.

We claim:

1. The method of stabilizing an organo-siloxane which comprises incorporating therein stabilizing amounts of an alkoxy phenyl amine selected from the class consisting of 4-isopropoxy diphenyl amine and 4,4' dimethoxy diphenyl amine, the organic substituents of said siloxane consisting essentially of monovalent hydrocarbon radicals attached to silicon through carbon-silicon linkages.

2. A composition of matter comprising an organo-siloxane and a minor proportion of an alkoxy phenyl amine selected from the class consisting of 4-isopropoxy diphenyl amine and 4,4' dimethoxy diphenyl amine, the organic substituents of said siloxane consisting essentially of monovalent hydrocarbon radicals attached to silicon through carbon-silicon linkages.

3. A composition of matter comprising a liquid polymeric organo-siloxane and a minor proportion of an alkoxy phenyl amine selected from the class consisting of 4-isopropoxy diphenyl amine and 4,4' dimethoxy diphenyl amine, said organo-siloxane having on the average from approximately 1 to approximately 2 monovalent hydrocarbon radicals attached to each silicon atom through carbon-silicon linkages, at least some of said hydrocarbon radicals being alkyl radicals.

4. A composition of matter comprising a liquid organo-siloxane comprising essentially structural units of the formula $(CH_3)_2SiO$ and a minor proportion of an alkoxy phenyl amine selected from the class consisting of 4-isopropoxy diphenyl amine and 4,4' dimethoxy diphenyl amine.

5. A composition of matter comprising a liquid methyl siloxane comprising essentially structural units of the formula $(CH_3)_2SiO$ and a minor proportion of 4-isopropoxy diphenyl amine.

6. A composition of matter comprising a liquid methyl siloxane comprising essentially structural units of the formula $(CH_3)_2SiO$ and a minor proportion of 4,4' dimethoxy diphenyl amine.

ROB ROY McGREGOR.
EARL LEATHEN WARRICK.